(12) United States Patent
Albizzati et al.

(10) Patent No.: US 6,444,604 B1
(45) Date of Patent: Sep. 3, 2002

(54) SUPPORTED CATALYSTS FOR THE POLYMERIZATION OF OLEFINS

(75) Inventors: Enrico Albizzati, Arona; Tiziano Dall'Occo; Luigi Resconi, both of Ferrara; Fabrizio Piemontesi, Borgosesia, all of (IT)

(73) Assignee: Basell Technology Company BV, Hoofddorp (NL)

( * ) Notice: Subject to any disclaimer, the term of this patent is extended or adjusted under 35 U.S.C. 154(b) by 0 days.

(21) Appl. No.: 09/589,994

(22) Filed: Jun. 8, 2000

Related U.S. Application Data

(63) Continuation of application No. 09/004,867, filed on Jan. 9, 1998, which is a continuation of application No. 08/842,599, filed on Apr. 16, 1997, now abandoned, which is a continuation of application No. 08/271,371, filed on Jul. 6, 1994, now abandoned.

(30) Foreign Application Priority Data

Jul. 7, 1993 (IT) ......................................... MI93A01467

(51) Int. Cl.$^7$ ............................ C08F 4/02; C08F 4/622; C08F 4/635; C08F 4/642
(52) U.S. Cl. ...................... 502/109; 502/110; 502/111; 502/118; 502/121; 502/122; 502/123; 502/124; 502/125; 526/160; 526/163; 526/153; 526/904
(58) Field of Search ................................ 502/109, 110, 502/111, 118, 121, 122, 123, 124, 125; 526/160, 153, 904

(56) References Cited

U.S. PATENT DOCUMENTS

| | | | |
|---|---|---|---|
| 4,147,664 A | | 4/1979 | Pomogailo et al. |
| 4,426,318 A | | 1/1984 | Fries et al. |
| 4,542,199 A | | 9/1985 | Kaminsky et al. |
| 4,564,647 A | | 1/1986 | Hayashi et al. |
| 4,632,912 A | | 12/1986 | Bedell et al. |
| 4,808,561 A | | 2/1989 | Welborn, Jr. |
| 4,921,825 A | | 5/1990 | Kioka et al. |
| 4,940,682 A | | 7/1990 | Sasaki et al. |
| 5,077,255 A | | 12/1991 | Welborn, Jr. |
| 5,118,648 A | | 6/1992 | Furtek et al. |
| 5,198,399 A | | 3/1993 | Hoff et al. |
| 5,362,824 A | * | 11/1994 | Furtek et al. ............... 526/114 |
| 5,455,214 A | | 10/1995 | Furtek et al. |
| 5,461,017 A | | 10/1995 | Furtek et al. |

FOREIGN PATENT DOCUMENTS

| | | |
|---|---|---|
| EP | 0 206 794 A1 | 8/1988 |
| EP | 0 279 863 A1 | 8/1988 |
| EP | 0 294 942 A1 | 12/1988 |
| EP | 0 295 312 A1 | 12/1988 |
| EP | 0 442 725 A3 | 8/1991 |
| EP | 0 496 405 A1 | 7/1992 |
| EP | 0 518 092 A2 | 12/1992 |
| EP | 0 546 690 A1 | 6/1993 |
| EP | 0 563 917 A1 | 10/1993 |
| EP | 0 598 543 A2 | 5/1994 |

OTHER PUBLICATIONS

Hartley, F.R., "Supported Metal Complexes," D. Reidel Publishing Co., (1985), pp. 11–14, 34–51, 261–262.
Chien, J.C.W. et al., "Olefin Copolymerization with Metallocene Catalysts, III. Supported Metallocene/ Methylaluminoxane Catalysts for Olefin Copolymerization," Jour. of Polym. Chem., vol. 29, pp. 1603–1607 (1991).
Kaminsky, W., et al., "High Melting Polypropenes by Silica–Supported Zirconocene Catalysts," Makromol. Chem., Rapid Commun., vol. 14. pp. 239–243 (1993).
Chien, J.C.W. et al., "Olefin Copolymerization with Metallocene Catalysts. IV. Metallocene/Methylaluminoxane Catalyzed Olefin Terpolymerization," Jour. of Polym. Chem., vol. 29, pp. 1609–1613 (1991).
Abstract of JP 04234405 A2, (1992).
Pomogailo, A.D., "Heterogenization of Homogeneous and Pseudohomogeneous Olefine Polymerization Catalytic Systems By means Of Macromolecular Carrier," Dokl. Akad. Nauk SSSR, vol. 232(2), pp. 391–394 (1977).
Dyachkovskii, F.S., et al., "Synthesis and Catalytic Properties of Transition–Metal Complexes Immoblized on Macromolecular Supports in Polymerizations Processes," Journ. Of Polymer Sci. Polymer Symposium vol. 68, pp. 97–108 (1980).
Pomogailo, A.D., "Immobilized Complex Catalysts of the Polymerization of Olefins," Dokl. Akad. Nauk SSSR, vol. 219(6), pp. 896–898 (1974).
Dyachkovskii, F.S., et al., "Distinctive Features of Olefin Polymerization in the Surface of Supports," Proceedings of the International Symposium Hamburg, Germany, pp. 67–78 (1987).
Bonds Jr., W.D., et al., "Polystyrene Attached Titanocene Species. Preparations and Reactions," Journ. of the Ameri. Chem. Soc., vol. 97:8, pp. 2128–2132 (1975).
Derwent Abstract of EP 0 563 917 A1, Oct. 1993.

* cited by examiner

Primary Examiner—David W. Wu
Assistant Examiner—R. Rabago
(74) Attorney, Agent, or Firm—Bryan Cave LLP

(57) ABSTRACT

Supported catalysts for the polymerization of olefins comprise the following components:

(A) a porous organic support functionalised with groups having active hydrogen atoms;

(B) an organo-metallic compound of aluminium containing heteroatoms selected from oxygen, nitrogen and sulphur; and (C) a compound of a transition metal selected from those of groups IVb, Vb or VIb of the Periodic Table of the Elements, containing ligands of the cyclopentadienyl type.

These supported catalysts, obtainable in the form of spherical particles, can be used in the polymerization reaction of olefins either in liquid or in gas phase, thus producing polymers endowed with a controlled morphology and with a high bulk density.

24 Claims, No Drawings

SUPPORTED CATALYSTS FOR THE POLYMERIZATION OF OLEFINS

CROSS REFERENCE TO RELATED APPLICATIONS

This application is a continuation of U.S. Ser. No. 09/004,867 filed Jan. 9, 1998, which is a continuation of U.S. application No. 08/842,599, filed Apr. 16, 1997, abandoned which is a continuation of U.S. Application Ser. No. 08/271,371, filed Jul. 6, 1994, abandoned

BACKGROUND OF THE INVENTION

1. Field of the invention

The present invention relates to a supported catalyst for the polymerization of olefins, to the process for the preparation thereof and to the use of said supported catalyst in processes for the polymerization of olefins.

2. Description of the Prior Art

Homogeneous catalytic systems for the polymerization of olefins based on coordination complexes of a transition metal such as titanium, zirconium or hafnium with ligands of the cyclopentadienyl type are known. Generally, these catalytic system comprise a soluble cocatalyst, such as the methylalumoxane (MAO).

These homogeneous catalytic systems show many advantages in comparison with traditional heterogeneous catalysts of the Ziegler-Natta type. In particular, they allow a careful control of the stereoregularity degree and type, the molecular weight distribution and comonomer distribution, besides making easier the use of higher alpha-olefins, diolefins and dienes as comonomers. Thus, new polymers or polymers endowed with remarkably improved properties can be obtained.

However, being soluble in the reaction system, these catalytic Systems can not easily be utilized in polymerization processes which are not carried out in solution. Furthermore, the polymers obtained by processes using the above mentioned catalysts, are generally not endowed with satisfactory morphological characteristics.

In order to avoid these drawbacks, systems have been suggested based on supporting at least one component of the above mentioned catalysts on insoluble solid supports. In most cases these solid supports consist of inorganic oxides and, in particular, of silica or alumina.

In the prior art, cases are found wherein the opportunity of using supports of the polymeric type is foreseen.

In European patent applications EP-279 863 and EP-295 312 supported homogeneous catalysts comprising methylalumoxane and bis(cyclopentadienyl)zirconium dichloride are described. Besides silica inorganic supports, organic supports consisting of polyethylene or polystyrene have been used. In the preparation of the supported catalysts, use has been made of n-decane, which has the function of precipitating the methylalumoxane. These supported catalysts, after a prepolymerization treatment with ethylene in n-decane, have been used in the polymerization reaction of ethylene in gas-phase. To attain acceptable results, high amounts of methylalumoxane for each gram of solid support have been used.

In European patent application EP-518 092 catalysts of the type metallocene/alumoxane supported on polypropylene are described. These catalysts have been used in the polymerization reaction of propylene carried out in liquid monomer or in gas phase. Nothing is said about the bulk density of the polymers obtained.

Although these types of catalytic systems supported on polymeric materials are useable in processes carried out in suspension or in gas phase with acceptable yields, however they do not allow polymers endowed with good morphological characteristics to be obtained.

SUMMARY OF THE INVENTION

It has now been found by the Applicant that metallocene/alumoxane catalytic systems can be advantageously made heterogeneous by supporting them on functionalised porous organic supports. By this way it is possible to obtain catalysts in form of spherical particles, endowed with acceptable activities able to produce polymers which duplicate the shape of the catalyst and therefore are endowed with controlled morphology and high bulk density.

Therefore, an object of the present invention is a supported catalyst for the polymerization of olefins comprising:
(A) a porous organic support functionalised with groups having active hydrogen atoms;
(B) at least one organo-metallic compound of aluminium containing at least one heteroatom selected from oxygen, nitrogen and sulphur; and
(C) at least one compound of a transition metal selected from those of groups IVb, Vb or VIb of the Periodic Table of the Elements, containing at least one ligand of the cyclopentadienyl type.

Another object of the present invention is a process for the preparation of a supported catalyst according to the present invention, which process comprises the step of contacting, in an inert solvent, the components (A), (B) and (C) among themselves.

Still another object of the present invention is a supported and pre-polymerized catalyst for the polymerization of olefins obtainable by subjecting a supported catalyst according to the present invention to a pre-polymerization treatment with at least one olefinic monomer.

A further object of the present invention is a process for the homo- or co-polymerization of olefins comprising the polymerization reaction of one or more olefinic monomers in the presence of a supported catalyst according to the present invention.

Still a further object of the present invention is a process for the homo- or co-polymerization of olefins comprising the polymerization reaction of one or more olefinic monomers in the presence of a supported and pre-polymerized catalyst according to the present invention.

DESCRIPTION OF THE PREFERRED EMBODIMENTS

The porosity (B.E.T.) of the organic support is generally higher than 0.2 cc/g, preferably higher than 0.5 cc/g, more preferably higher than 1 cc/g. In particular, supports suitably useable have a porosity comprised between 1 and 3 cc/g.

The surface area (B.E.T.) of the organic support is generally higher than 30 $m^2/g$, preferably higher than 50 $m^2/g$, more preferably higher than 100 $m^2/g$. In particular, the surface area can reach values of about 500 $m^2/g$ and over.

The organic support is preferably in form of particles having controlled morphology, in particular microspheroidal morphology with a diameter comprised between about 5 and 1000 $\mu$m, preferably between 10 and 500 $\mu$m, more preferably between 20 and 200 $\mu$m.

Supports which can be used in the catalysts according to the present invention are those polymers, endowed with the above mentioned characteristics regarding the porosity and surface area, which show functional groups having active hydrogen atoms.

Examples of suitable functional groups are hydroxyl groups, primary and secondary amino groups, sulphonic groups, carboxylic groups, amido groups, N-monosubstituted amido groups, sulphonamido groups, N-monosubstituted sulphonamido groups, sulphydril groups, imido groups and hydrazido groups.

The amount of functional groups contained in the supports is generally higher than 0.2 milliequivalents (meq) for each gram of solid support, preferably higher than 0.5 meq for each gram of solid support, more preferably is comprised between 1 and 6 meq for each gram of solid support.

A class of supports particulary suitable for use in the catalysts of the present invention can be obtained from partially cross-linked porous styrenic polymers. These supports can be prepared by copolymerization of styrenic monomers, such as styrene, ethylvinylbenzene, vinyltoluene, methylstyrene and mixtures thereof, with comonomers able to be cross-linked, such as divinylbenzene, divinyltoluene and mixtures thereof. Preferred styrenic polymers are partially cross-linked styrene/divinylbenzene copolymers. Methods for the preparation of these copolymers are described, for example, in U.S. Pat. No. 4,224,415, the content of which is incorporated in the present description.

Porous polymers of this type can be functionalised by means of known methods. The most common methods to functionalise polystyrene resins are reported in "Comprehensive Pol. Sci., Pergamon Press, pages 82–85 (1989)".

A method for the preparation of alpha-hydroxyalkylated resins is described by I. Fujita et al. in "Separation Science and Technology, 26, 1395–1402, (1991)".

Functionalized porous styrenic polymers useable as supports according to the present invention are, moreover, those which can be directly obtained from the copolymerization of styrenic monomers with comonomers functionalized with groups containing active hydrogens or their precursors. Examples of these polymers are the styrenic copolymers functionalised with hydroxy groups, which are described in the European patent application EP-496 405.

The transition metal of groups IVb, Vb or VIb of the Periodic Table of the Elements is preferably selected from titanium, zirconium, hafnium and vanadium, more preferably is zirconium.

Transition metal compounds useable in the supported catalysts according to the present invention are, for example, the cyclopentadienyl compounds of formula (I):

$$(C_5R^1_{5-m})R^2_m(C_5R^1_{5-m})_mMQ_{p-n} \tag{I}$$

wherein M is Ti, Zr, Hf or V; the two $C_5R^1_{5-m}$ groups, are cyclopentadienyl rings equally or differently substituted; substituents $R^1$, same or different from each other, are hydrogen, alkyl, alkenyl, aryl, alkaryl or aralkyl radicals containing from 1 to 20 carbon atoms which may also contain Si or Ge atoms or $Si(CH_3)_3$ groups, or furthermore two or four substituents $R^1$ of a same cyclopentadienyl ring may form one or two rings having from 4 to 6 carbon atoms; $R^2$ is a bridging group which links the two cyclopentadienyl rings and is selected among $CR^3_2$, $C_2R^3_4$, $SiR^3_2$, $Si_2R^3_4$, $GeR^3_2$, $Ge_2R^3_4$, $R^3_2SiCR^3_2$, $NR^1$ or $PR^1$, wherein the substituents $R^3$, same or different from each other, are $R^1$ or two or four substituents $R^3$ may form one or two rings having from 3 to 6 carbon atoms; substituents Q, same or different form each other, are halogen, hydrogen, $R^1$, $OR^1$, $SR^1$, $NR^1_2$ or $PR^1_2$; m can be 0 or 1; n can be 0 or 1, being 1 if m=1; p can be 2 or 3, preferably it is 3.

In the case of m=0, particulary suitable cyclopentadienyl compounds are those wherein the groups $C_5R^1_{5-m}$ are selected among cyclopentadienyl, pentamethylcyclopentadienyl, indenyl and 4,5,6,7-tetrahydroindenyl groups, and substituents Q are selected among chlorine atoms and $C_1$–$C_7$ hydrocarbon groups, preferably methyl groups.

Non limitative examples of cyclopentadienyl compounds of formula (I), wherein m=0, are:

| | | |
|---|---|---|
| $(Cp)_2MCl_2$ | $(MeCp)_2MCl_2$ | $(BuCp)_2MCl_2$ |
| $(Me_3Cp)_2MCl_2$ | $(Me_4Cp)_2MCl_2$ | $(Me_5Cp)_2MCl_2$ |
| $(Me_5Cp)_2MMe_2$ | $(Me_5Cp)_2M(OMe)_2$ | $(Me_5Cp)_2M(OH)Cl$ |
| $(Me_5Cp)_2M(OH)_2$ | $(Me_5Cp)_2M(C_6H_5)_2$ | $(Me_5Cp)_2M(CH_3)Cl$ |
| $(EtMe_4Cp)_2MCl_2$ | $[(C_6H_5)Me_4Cp]_2MCl_2$ | $(Et_5Cp)_2MCl_2$ |
| $(Me_5Cp)_2M(C_6H_5)Cl$ | $(Ind)_2MCl_2$ | $(Ind)_2MMe_2$ |
| $(H_4Ind)_2MCl_2$ | $(H_4Ind)_2MMe_2$ | $\{[Si(CH_3)_3]Cp\}_2MCl_2$ |
| $\{[Si(CH_3)_3]_2Cp\}_2MCl_2$ | $(Me_4Cp)(Me_5Cp)MCl_2$ | $(Me_5Cp)MCl_3$ |
| $(Me_5Cp)MBenz_3$ | $(Ind)MBenz_3$ | $(H_4Ind)MBenz_3$ |
| $(Cp)MBu_3$ | $(Me_5Cp)MCl$ | $(Me_5Cp)MH$ | wherein Me=methyl, Et=ethyl, Bu=butyl, Cp=cyclopentadienyl, Ind=indenyl, $H_4Ind$=4,5,6,7-tetrahydroindenyl, Benz=benzyl, M is Ti, Zr, Hf or V, preferably is Zr.

In the case of m=1, particulary suitable cyclopentadienyl compounds are those wherein the groups $C_5R_{5-m}$, are selected among cyclopentadienyl, tetramethylcyclopentadienyl, indenyl, 2-methyl-indenyl, 4,7-dimethyl-indenyl, 2,4,7-trimethyl-indenyl, 4,5,6;7-tetrahydroindenyl, 2-methyl-4,5,6,7-tetrahydroindenyl, 4,7-dimethyl-4,5,6,7-tetrahydroindenyl, 2,4,7-trimethyl-4,5,6,7-tetrahydroindenyl or fluorenyl groups, $R^2$ is a divalent group selected among $(CH_3)_2Si$, $C_2H_4$ and $C(CH_3)_2$, and substituents Q are selected among chlorine atoms and $C_1$–$C_7$ hydrocarbon groups, preferably methyl groups.

Non limitative examples of cyclopentadienyl compounds of formula (I), wherein m=1, are: $Me_2Si(Me_4Cp)_2MCl_2$ $Me_2Si(Me_4Cp)_2MMe_2$ $Me_2C(Me_4Cp)(MeCp)MCl_2$ $Me_2Si(Ind)_2MCl_2$ $Me_2Si(Ind)_2MMe_2$ $Me_2Si(Me_4Cp)_2MCl(OEt)$ $C_2H_4(Ind)_2MCl_2$ $C_2H_4(Ind)2MMe_2$ $C_2H_4(Ind)_2M(NMe_2)_2$ $C_2H_4(H_4Ind)_2MCl_2$ $C_2H_4(H_4Ind)_2MMe_2$ $C_2H_4(H_4Ind)_2M(NMe_2)OMe$ $Ph(Me)Si(Ind)_2MCl_2$ $Ph_2Si(Ind)_2MCl_2$ $Me_2C(Flu)(Cp)MCl_2$ $C_2H_4(Me_4Cp)_2MCl_2$ $C_2Me_4(Ind)_2MCl_2$ $Me_2SiCH_2(Ind)_2MCl_2$ $C_2H_4(2\text{-MeInd})_2MCl_2$ $C_2H_4(3\text{-MeInd})_2MCl_2$ $C_2H_4(4,7\text{-Me}_2Ind)_2MCl_2$ $C_2H_4(5,6\text{-Me}_2Ind)_2MCl$ $C_2H_4(2,4,7\text{-Me}_3Ind)_2MCl_2$ $C_2H_4(3,4,7\text{-Me}_3Ind)_2MCl_2$ $C_2H_4(2\text{-MeH}_4Ind)_2MCl_2$ $C_2H_4(4,7\text{-Me}_2H_4Ind)_2MCl_2$ $C_2H_4(2,4,7\text{-Me}_3H_4Ind)_2MCl_2$ $C_2H_4(Benz[e]Ind)_2MCl_2$ $C_2H_4(2\text{-Me-Benz}[e]Ind)_2MCl_2$ $Me_2Si(2\text{-MeInd})2MCl_2$ $Me_2Si(3\text{-MeInd})_2MCl_2$ $Me_2Si(4,7\text{-Me}_2Ind)_2MCl_2$ $Me_2Si(5,6\text{-Me}_2Ind)_2MCl$ $Me_2Si(2,4,7\text{-Me}_3Ind)_2MCl_2$ $Me_2Si(3,4,7\text{-Me}_3Ind)_2MCl_2$ $Me_2Si(2\text{-MeH}_4Ind)_2MCl_2$ $Me_2Si(4,7\text{-Me}_2H_4Ind)_2MCl_2$ $Me_2Si(2,4,7\text{-Me}_3H_4Ind)_2MCl_2$ $Me_2Si(Flu)_2MCl_2$ $C_2H_4(Flu)_2MCl_2$ $Me_2Si(Benz[e]Ind)_2MCl_2$ $Me_2Si(2\text{-Me-Benz}[e]Ind)_2MCl_2$ wherein Me=methyl, Cp=cyclopentadienyl, Ind=indenyl, Flu=fluorenyl, Ph=phenyl, $H_4ind$=4,5,6,7-tetrahydroindenyl, M is Ti, Zr, Hf or V, preferably is Zr.

Another type of transition metal compounds useable in the supported catalysts according to the present invention, are the mono-cyclopentadienyl "constrained geometry" compounds described, for example, in European patent applications EP-416 815, EP-420 436 and EP-520 732, the content of which is incorporated in the present description.

Organo-metallic compounds of aluminium useable in the supported catalysts according to the invention are, for example, linear, branched or cyclic alumoxane containing at least one group of the type:

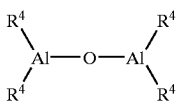

wherein the substituents $R^4$, same of different form each other, are defined as $R^1$ or are a group $—O—Al(R^4)_2$, and optionally some $R^4$ can be halogen atoms.

In particular, it is possible to use alumoxanes of formula (II):

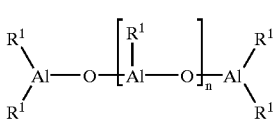

in case of linear compounds, wherein n is 0 or an integer comprised between 1 and 40, or alumoxanes of formula (III):

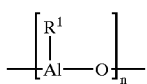

in case of cyclic compounds, wherein n is an integer comprised between 2 and 40. Radicals $R^1$ are defined as above.

Examples of alumoxanes suitable for use in the supported catalysts of the present invention are those in which radicals $R^1$ are selected among methyl, ethyl and isobutyl groups, particularly methylalumoxane (MAO) and isobutylalumoxane (TIBAO).

A special class of organo-metallic compounds of aluminium useable in the supported catalysts according to the invention is that of compounds obtainable by reaction of aluminium alkyls or alkylhydrides with water in molar ratio comprised between 1:1 and 100:1 respectively. Compounds of this type are described in European patent application EP-575 875, the content of which is incorporated in the present description.

Moreover, organo-metallic compounds of aluminium useable in the supported catalysts of the invention are those of formula (IV):

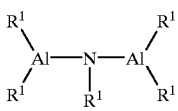

or of formula (V):

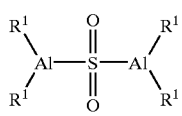

wherein $R^1$ is defined as above.

The molar ratio between the aluminium and the transition metal in the supported catalysts of the invention is generally comprised between 10 and 500, preferably between 20 and 200, more preferably between 30 and 100.

The supported catalysts of the present invention can be prepared by contacting the components (A), (B) and (C) among themselves in different sequences.

An advantageous process for the preparation of a supported catalysts according to the present invention comprises contacting in an inert solvent
 (A) a porous organic support functionalised with groups having active hydrogen atoms, and
 (B) at least one organo-metallic compound of aluminium containing at least one heteroatom selected from oxygen, nitrogen and sulphur; thereafter contacting the thus obtained product with
 (C) at least one compound of a transition metal selected from those of groups IVb, Vb or VIb of the Periodic Table of the Elements, containing at least one ligand of the cyclopentadienyl type;
and finally recovering the supported catalyst by removing the solvent.

Another process for the preparation of a supported catalyst according to the present invention comprises contacting in an inert solvent
 (B) at least one organo-metallic compound of aluminium containing at least one heteroatom selected from oxygen, nitrogen and sulphur, and
 (C) at least one compound of a transition metal selected from those of groups IVb, Vb or VIb of the Periodic Table of the Elements, containing at least one ligand of the cyclopentadienyl type;
thereafter contacting the thus obtained product with
 (A) a porous organic support functionalised with groups having active hydrogen atoms;
and finally recovering the supported catalyst by removing the solvent.

Yet another process for the preparation of a supported catalyst according to the present invention comprises contacting in an inert solvent
 (A) a porous organic support functionalised with groups having active hydrogen atoms, and
 (B) at least one organo-metallic compound of aluminium containing at least one heteroatom selected from oxygen, nitrogen and sulphur;
contacting in an inert solvent
 (B) at least one organo-metallic compound of aluminium containing at least one heteroatom selected from oxygen, nitrogen and sulphur, and
 (C) at least one compound of a transition metal selected from those of groups IVb, Vb or VIb of the Periodic Table of the Elements, containing at least one ligand of the cyclopentadienyl type;
thereafter contacting the product obtained by contacting (A) and (B) with the product obtained by contacting (B) and (C); and finally recovering the supported catalyst by removing the solvent.

The above indicated processes for the preparation of the supported catalysts of the invention are conducted at a temperature which is generally comprised between −80 and 100° C.

The organic support can be advantageously pre-contacted with aluminium alkyl compounds of formula (VI):

$$R^5_q AlX_{3-q} \qquad (VI)$$

wherein $R^5$ is selected among alkyl, alkenyl, aryl, alkaryl and aralkyl radicals containing from 1 to 10 carbon atoms, X is selected among hydrogen and halogen atoms, q is an integer comprised between 1 and 3.

Non limitative examples of aluminum alkyl compounds of formula (VI) are aluminium trialkyls such as trimethylaluminium, triethylaluminium, triisopropylaluminium and triisbbutylaluminium; dialkylaluminium halides such as dimethylaluminium chloride, diethylaluminium chloride, diisopropylaluminium chloride and diisobutylaluminium chloride; dialkylaluminium hydrides such as diethylaluminium hydride and diisobutylaluminium hydride; isoprenylaluminium. A preferred aluminium alkyl compound is triisobutylaluminium.

The supported catalysts of the present invention, before being used, can be subjected to a pre-polymerization treatment, by pre-contacting them with small amounts of at least an olefinic monomer.

The pre-polymerization treatment is generally carried out in an organic solvent. The amount of polymer produced in this step is generally comprised between 0.5 and 10 parts by weight with respect to the weight of the supported catalyst used.

The pre-polymerization can be advantageously carried out in the presence of aluminium alkyl compounds of formula (VI):

$$R^5_q AlX_{3-q} \qquad (VI)$$

wherein $R^5$, X and q are defined as above, or in the presence of organo-metallic compounds of aluminium (B) as above described, in particular alumoxanes. Aluminium alkyl compounds of formula (VI) are preferred.

The supported catalysts of the present invention are useable in the homo- or co-polymerization reactions of olefins.

Before the use, the supported catalysts of the invention and, in particular, those which are not pre-polymerized, can be advantageously pre-contacted with alkyl aluminium compounds of formula (VI):

$$R^5_q AlX_{3-q} \qquad (VI)$$

wherein $R^5$, X and q are defined as above, or with organo-metallic compounds of aluminium (B) as above described, in particular alumoxanes. Aluminium alkyl compounds of formula (VI) are preferred.

The supported catalysts according to the present invention can be suitably used for the homopolymerization of ethylene and, in particular, for the preparation of HDPE.

Moreover, the supported catalysts of the invention can be suitably used for the copolymerization of ethylene with olefin comonomers and, in particular for the preparation of LLDPE.

The obtained LLDPE copolymers have a content of ethylene units generally comprised between 80 and 99% by mole. Their density is generally comprised between 0.87 and 0.95 cc/g and they are characterized by an uniform distribution of the comonomeric units within the polymeric chain.

Olefins which can be suitably used as comonomers in the above said ethylene copolymers are alpha-olefins of formula $CH_2=CHR$, wherein R is a linear or branched or cyclic radical containing from 1 to 20 carbon atoms, as well as cycloolefins.

Non-limitative examples of these olefins are propylene, 1-butene, 1-pentene, 4-methyl-1-pentene, 1-hexene, 1-octene, 1-decene, 1-dodecene, 1-tetradecene, 1-hexadecene, 1-octadecene, 1-eicosene, alkylcyclohexane, cyclopentene, cyclohexene, norbornene, 4,6-dimethyl-1-heptene.

The above ethylene copolymers can also contain small amounts of units deriving from polyenes, in particular from dienes, conjugated or not, linear or cyclic, such as, for example, 1,4-hexadiene, isoprene, 1,3-butadiene, 1,5-hexadiene, 1,6-heptadiene.

The ethylene copolymers contain units deriving from olefins of formula $CH_2=CHR$, from cycloolefins and/or from polyenes in amounts generally comprised from 1% to 20% by mole.

Another use of interest for the supported catalysts of the present invention is for the preparation of elastomeric copolymers of ethylene with a-olefins of formula $CH_2=CHR$, wherein R is an alkyl radical containing from 1 to 10 carbon atoms, optionally containing lower proportions of units deriving from a polyene.

Saturated elastomeric copolymers obtained with the supported catalysts of the invention generally contain from 15% to 85% by mole of ethylene units, the rest being constituted of units of one or more alpha-olefins and/or of one non-conjugated diolefin able to cyclopolymerize.

Unsaturated elastomeric copolymers contain, besides units deriving from the polymerization of ethylene and alpha-olefins, also lower proportions of unsaturated units deriving from the co-polymerization of one or more polymers. The content of unsaturated units is generally comprised between 0.1% and 5% by weight and, preferably, is comprised between 0.2 and 2% by weight.

The elastomeric copolymers of ethylene obtainable with the supported catalysts of the invention are characterized by valuable properties such as low content of ashes and a uniform distribution of the comonomers in the polymeric chain.

Alpha-olefins which can be suitably used as comonomers in the above said elastomeric ethylene copolymers are, for example, propylene, 1-butene, 1-hexene, 4-methyl-1-pentene.

As non conjugated olefins able to cyclopolymerize, 1,5-hexadiene, 1,6-heptadiene, 2-methyl-1,5-hexadiene can be used.

Polyenes which can be used as comonomers are those comprised in the following classes:

non-conjugated diolefins capable of cyclopolymerization such as, for example, 1,5-hexadiene, 1,6-heptadiene, 2-methyl-1,5-hexadiene;

dienes capable of giving unsaturated monomeric units, in particular conjugated dienes such as, for example, butadiene and isoprene; linear non-conjugated dienes such as, for example, trans 1,4-hexadiene, cis 1,4-hexadiene, 6-methyl-1,5-heptadiene, 3,7-dimethyl-1,6-octadiene, 11-methyl-1,10-dodecadiene; monocyclic diolefins such as, for example, cis-1,5-cyclooctadiene and 5-methyl-1,5-cyclooctadiene; dicyclic diolefins such as for example 4,5,8,9-tetrahydroindene and 6 and/or 7-methyl-4,5,8,9-tetrahydroindene; alkenyl or alkyliden norbonenes such as for example 5-ethyliden-2-norbornene, 5-isopropyliden-2-norbornene, exo-5-isopropenyl-2-norbornene; polycyclic diolefins such as for example, dicyclopentadiene, tricyclo-[6.2.1.0$^{2,7}$]-4,9-undecadiene and the 4-methylderivative thereof.

Still another use of interest of the supported catalysts of the invention is for the homo- or co-polymerization of propylene and alpha-olefins such as, for example, 1-butene. Depending on the catalytic system used, polymers showing isotactic, syndiotactic or atactic structure can be obtained.

A further use of interest of the supported catalysts of the invention is for the preparation of polymers of cycloolefins. Monocyclic or polycyclic olefinic monomers can be either homopolymerized or copolymerized also with non cyclic olefinic monomers. Not limitative examples of cycloolefinic polymers which can be prepared with the supported catalysts of the invention are described in European patent applications EP-501 370 and EP-407 870, the content of which is incorporated in the present description.

The polymerization processes which make use of the supported catalysts of the present invention can be carried out in liquid phase, in the presence or not of an inert hydrocarbon solvent. The solvent can be aliphatic such as, for example, propane, hexane, heptane, isobutene, cyclohexane, or aromatic such as, for example, toluene.

The polymerization processes which make use of the supported catalysts of the present invention can be advantageously carried out in gas phase.

The polymerization temperature is generally comprised between 0° C. and 250° C. In particular, in the processes for the preparation of HDPE and LLDPE, the polymerization temperature is generally comprised between 20° C. and 150° C. and, particularly, between 40° C. and 90° C. In the processes for the preparation of elastomeric copolymers the polymerization temperature is generally comprised between 20° C. and 100° C. and, particularly, between 30° C. and 80° C. The molecular weight of the copolymers can be varied merely by varying the polymerization temperature, the type or the concentration of the catalytic components or by using molecular weight regulators such as, for example, hydrogen.

The molecular weight distribution can be varied either using mixtures of different metallocenes, or carrying out the polymerization in more steps which differ in the polymerization temperature and/or in the concentrations of the molecular weight regulator.

Polymerization yields depend on the purity of the metallocene component of the catalyst. Therefore, the metallocene compounds can be used in the supported catalysts of the invention either as such, or they can be subjected to purification treatments.

The polymers obtainable with the supported catalysts of the present invention are endowed with good morphological characteristics and can be obtained in form of spherical particles having diameters which can be comprised between 100 and 3000 $\mu$m, depending on the catalyst and on the polymerization conditions used.

The following examples are given to illustrate and not to limit the invention.

CHARACTERIZATIONS

The presence of functional groups on the supports was confirmed by I.R. analysis. The quantitative determination of the functional groups containing active hydrogen atoms was carried out by gas-volumetric measurement during the reaction of the supports with aluminium triethyl.

The porosities and surface areas were determined by nitrogen adsorption according to the method B.E.T. using an instrument SORPTOMATIC 1900 by Carlo Erba, as well as by mercury porosimetry by means of a POROSIMETER 2000 by Carlo Erba.

The intrinsic viscosities (I.V.) were measured in tetrahydronaphthalene at 135° C.

The Differential Scannery Calorimetry measurements were carried out on an instrument DSC-7, of Perkin Elmer Co. Ltd., according to the following method. About 10 mg of sample were heated at 180° C. with a scanning speed equal to 10° C./min. The sample was kept at 180° C. for 5 minutes and thereafter cooled with a scanning speed equal to 10° C./min. Thereafter, a second scanning was carried out according to the same modalities of the first one. The values reported are those obtained in the second scanning.

The contents of the comonomer units in the copolymers were determined by I.R. analysis.

The absolute densities of the polymers were determined by density gradient columns according to the ASTM method D-1505.

The tamped bulk density (T.B.D.) and the poured bulk density (P.B.D.) were determined according to the method DIN-53194.

PREPARATION OF THE CATALYTIC COMPONENTS ETHYLENE-BIS(INDENYL) ZIRCONIUM DICHLORIDE (A) Preparation of 1.2-bisindenylethane The preparation described in J. Ewen, J. Am. Chem. Soc., 1987, 109,6544, Suppl. mat. was followed.

Into a 2 liter two-necked round-bottomed flask, 50 g of indene (437 mmol) were dissolved under inert atmosphere with 500 ml of tetrahydrofuran and were cooled to −78°C. By slow dropping (1 hour) 175 ml of n-butyllithium (2.5M in hexane, 437.5 mmol) were added. The mixture was allowed to heat up to room temperature and was kept under stirring for 4 hours. It was cooled to −78° C. and 40.42 g of dibromoethane (215 mmol) dissolved in 100 ml of tetrahydrofuran were dropped (within 20 minutes). After the end of the addition, the temperature was raised to 50° C., the whole was kept under stirring for 12 hours, then was cooled down to room temperature and 20 ml of water were added. The organic phase was dried and the residue was extracted with pentane. By evaporation under vacuum 28.65 g of product were obtained (yield=51.6%).

(B) Preparation of ethylene-bis(indenyl)zirconium dichloride

Into a 250 ml two-necked round-bottomed flask provided with cooler, 8 g (31 mmol) of 1,2-bisindenylethane and 100 ml of anhydrous tetrahydrofuran were introduced, thus obtaining a yellow solution. After cooling to −78° C., 40 ml of butyllithium (1.6M in hexane, 64 mmol) were added dropwise, thus obtaining a precipitate which by heating dissolved again thus giving a reddish-yellow solution. Into a 250 ml four-necked round-bottomed flask, provided with cooler, 8.67 g of ZrCl$_4$ (37.2 mmol) were introduced; this was cooled to −196° C., and in this 50 ml of tetrahydrofuran were condensed (strongly exothermic reaction), the mixture was allowed to heat up to room temperature and thereafter it was heated under reflux for 40 minutes. At room temperature and while stirring, the solution of the lithium salt of bisindenylethane was added to the solution of the adduct ZrCl$_4$/THP and was kept stirred for 20 hours in the dark. At 0° C. gaseous HCl was bubbled in, thus obtaining a yellow solution together with a precipitate of the same colour. The solution was concentrated by evaporating under vacuum part of the solvent, was cooled to −20° C. and filtered off. The precipitate was further purified by extraction with dichloromethane, thus obtaining 2.3 g (14.7%) of product.

ETHYLENE-BIS(4.7-DIMETHYL-INDENYL) ZIRCONIUM DICHLORIDE (A) Preparation of 4.7-dimethylindene The synthesis was carried out according to the method described in "Organometallics, 1990, 9, 3098" (yield 54% from p-xylene).

(B) Preparation of 1.2-bis(4. 7-dimethyl-3-indenyl)ethane 38.2 g (265 mmol) of 4,7-dimethylindene were dissolved in 350 ml of tetrahydrofuran and the temperature of the solution was raised to 0° C. Thereafter, 165 ml of n-butyl-lithium (1.6M in hexane, 264 mmol) were added dropwise over 2.5 hours. After having allowed the whole to again reach room temperature and whilst stirring for 4 hours, a purple-red solution of 4,7-dimethylindenyllithium was obtained. This solution was cooled to −70° C. and treated, dropwise for 35 minutes, with 25.3 g of 1,2-dibromethane (135 mmol) in 15 ml of tetrahydrofuran. After the temperature was raised again to room temperature, a light yellow solution was obtained to which water was added. The organic phase was collected and dried on $Na_2SO_4$. The solvent was then evaporated under vacuum and 20 g of product (yield 48%) were obtained.

(C) Preparation of rac- and meso-ethylene-bis(4.7-dimethyl-1-indenyl)zirconium dichloride A suspension of 10 g of 1,2-bis(4,7-dimethyl-3-indenyl)ethane (31.8 mmol) in 80 ml of tetrahydrofuran was added through a small tube to a solution of 2.82 g of KH (70.3 mmol) in 160 ml of tetrahydrofuran, kept under stirring. After the formation of hydrogen ceased, the resulting brown solution was separated from the excess KH. This solution and a solution of 12 g of ZrCl4 $(THF)_2$ (31.8 mmol) in 250 ml of tetrahydrofuran were added, dropwise, over 3 hours, by means of a small tube, into a round bottomed flask containing 50 ml of tetrahydrofuran kept under rapid stirring.

A yellow solution and a precipitate were formed. After removal of the solvent under vacuum, the orange-yellow residue (mixture of racemo and meso isomers in the ratio 2.33:1 at the $^1$H-NMR analysis) was subjected to extraction with $CH_2Cl_2$ until all the orange product was completely dissolved. The yellow solid (1.7 g) resulted in being a single stereoisomer, that is the meso (yield 11.3%). After evaporation of $CH_2Cl_2$ from the orange solution, 4.9 g of an orange solid corresponding to a mixture of 93.7% racemo and 6.3% meso isomers (Yield 32.5%) was obtained. This solid was then recrystallized from toluene at −20° C.

ETHYLENE-BIS(4.5,6,7-TETRAHYDROINDENYL)ZIRCONIUM DICHLORIDE

It was prepared according to the method described in "H. H. Brintzinger et al., J. Organomet. Chem., 288, p.63 (1985)".

METHYLALUMOXANE (MAO)

A commercial product (Schering, MW 1400) was used in a 30% b.w. toluene solution. After having removed the volatile fractions under vacuum, the vitreous material was ground up to obtain a white powder which was further treated under vacuum (0.1 mmHg) for 4 hours at a temperature of 40° C. The powder thus obtained showed good flowability properties.

EXAMPLE 1

Preparation of a polystyrenic resin

Into a 30 liter glass reactor, equipped with thermometer, reflux condenser, blade stirrer and thermoregulation system, an aqueous solution consisting of:

11 l. of distilled water 400 ml of a ROAGIT SVM (Rohm) 5% b.w. solution in water;

55.5 g of PROLIT C10 (Caffaro);

11 g of sodium chloride was introduced under nitrogen atmosphere.

The whole was stirred (350 r.p.m.) at room temperature for 1 hour; thereafter an organic solution consisting of:

5.55 l. n-octane;

1.85 l. of toluene;

1.55 l. of styrene;

2.55 l. of 64% of divinylbenzene in ethylvinylbenzene;

74 g of 75% dibenzoylperoxide in water was introduced.

The temperature of the reactor was raised to 80° C. over 1 hour, maintained for 8 hours, then cooled again to room temperature. The product obtained was subjected to repeated washing with distilled water, extraction with methanol at 50° C. and, subsequently, drying at 100° C. and 1 mmHg of residual pressure. 2.7 Kg of product showing microspheroidal morphology was obtained. The product has the following characteristics:

Surface area: 370 $m^2/g$ (B.E.T.), 126 $m^2/g$ (Hg);
Porosity: 1.74 ml/g (B.E.T.), 1.92 ml/g (Hg);
Average radius of pores: 94 Å (B.E.T.), 305 Å (Hg);
Particle size distribution (P.S.D.):
0.8% 300 µm;
2.2% 300–250 µm;
7.0% 250–180µm;
10.5% 180–150µm;
73.2% 150–106 µm;
5.5% 106–75 µm;
0.8% 75 µm.

Preparation of a functionalized polystyrenic support (A) Acylation

Into a 750 ml glass reactor, provided with thermometer, reflux condenser, blade stirrer and thermoregulation system, 300 ml of carbon sulphide and 30 g of the polystyrenic resin were introduced under a nitrogen atmosphere. After having thermostatted at the temperature of 12° C., 66 g (0.49 mol) of previously milled $AlCl_3$ and thereafter 32 ml of freshly distilled $CH_3COCl$ were added over 1 hour. The temperature was then raised to 25° C. and the whole was kept stirred for 6 hours. The mixture was then transferred into a 3 liter round-bottomed flask, kept stirred, containing a mixture of about 1 Kg of milled ice and 300 ml of HCl (37%) and was stirred for 30 minutes. The resin recovered after filtration was subjected to repeated washing with distilled water, then with acetone and finally with methanol. After drying, 34 g of product showing microspheroidal morphology was recovered. The I.R. spectrum showed a band centered at 1685 $cm^{-1}$ attributable to the carbonyl groups.

(B) Reduction

Into a 500 ml glass reactor provided with thermometer, reflux condenser, blade stirrer, 15.2 g of the acylated resin obtained at point (A), 100 ml of dioxane, 100 ml of distilled water and 15 g of $NaBH_4$ were introduced. The mixture was kept stirred at a temperature of 25° C. for 50 hours and, after addition of further 4 g of $NaBH_4$ was kept stirred for further 70 hours. The resin recovered after filtration was subjected to repeated washing with distilled water, then with acetone and finally with methanol. After drying, 13.4 g of product showing microspheroidal morphology were recovered. The I.R. spectrum showed a widened band centered at 3440 cm$^{-1}$ attributable to the hydroxyl groups, while the band at 1685 cm$^{-1}$ of the carbonyl appeared very reduced in comparison with that of the resin of point (A). The content of hydroxyl groups, determined by gas-volumetric titration with aluminium triethyl, is of 3.3 meq per gram of resin.

EXAMPLE 2

(A) Preparation of a supported catalyst

Into a 350 ml glass reactor, provided with thermometer, reflux condenser, blade stirrer and thermoregulation system, 100 ml of anhydrous toluene and 5.24 g of the resin obtained in example 1(B) were introduced. The mixture, thermostatted at 0° C. and kept stirred, was added over 40 minutes with 30 ml of a 1M toluene solution of methylalumoxane (MAO). The mixture was reacted at a temperature of 0° C. for 1 hour, then at a temperature of 30° C. for 1 hour, thereafter at a temperature of 80° C. for 4 hours. After having cooled to 25° C., 50 ml of a toluene solution containing 221.2 mg of ethylene-bis(indenyl)-zirconium dichloride was added over 55 minutes. The temperature was raised to 30° C. and the whole was kept stirred for 2 hours. A reddish solution was obtained which was allowed to decant, thus obtaining a precipitate and a colourless solution which was removed by drainage. The precipitate was repeatedly washed with anhydrous toluene and then dried under vacuum. 8 g of product showing microspheroidal morphology was recovered, having the following composition: Zr=0.38%, Cl=0.60%, Al=9.8%.

(B) Pre-polymerization

Into a 350 ml glass reactor, provided with thermometer, reflux condenser, blade stirrer and thermoregulation system, 150 ml of anhydrous hexane, 1.145 g of the catalyst obtained in example 2(A) and 2 ml of a heptane solution containing 5 mmol of aluminium triisobutyl (TIBAL) were introduced under anhydrous nitrogen atmosphere. The mixture was thermostatted at 35° C. and kept stirred for 15 minutes. Thereafter ethylene was supplied at a pressure of 30 mmHg for 90 minutes. After having removed the solvent by evaporation under vacuum, 5.8 g of a pre-polymer showing microspheroidal morphology was recovered.

EXAMPLE 3

Ethylene/1-butene copolymerization

Into a 1.35 liter steel autoclave, provided with stirrer, manometer, temperature indicator, supplying system for the catalyst, feeding lines of monomers and thermostat, purified by washing with propane at 70° C., 640 ml. of propane and the amounts of 1-butene, ethylene and hydrogen indicated in Table 1 were introduced at room temperature. The suspension of the catalyst was prepared as follows. The solid catalyst of example 2(A) and a solution of triisobutyl aluminium (TIBAL) in 10 ml of hexane was introduced into a dropping funnel. After 5 minutes at the temperature of 20° C., the suspension was injected into the autoclave under ethylene pressure. The temperature then was brought over 5 minutes to the value requested for the polymerization and kept constant for the polymerization time. The total pressure was kept constant by feeding an ethylene/1-butene mixture. The reaction was then interrupted by quick degassing of monomers and the polymer obtained was dried in oven at 60° C. under nitrogen stream.

The polymerization conditions are reported in Table 1. The data relating to the characterization of the obtained polymer are reported in Table 2.

EXAMPLE 4

Ethylene/1-butene copolymerization in gas phase

Into a 1.35 liter steel autoclave, provided with stirrer, manometer, temperature indicator, supplying system for the catalyst, feeding lines of the monomers and thermostatting jacket, purified by washing with ethylene at 70° C., 60 g of NaCl, previously dried were introduced at room temperature. Thereafter, the amounts of ethylene, 1-butene and hydrogen reported in Table 3 were supplied. The suspension of the catalyst was prepared as follows. Into a dropping funnel the solid catalyst of example 2(A) and a solution of aluminium triisobutyl in 10 ml of hexane (TIBAL) was introduced. After 5 minutes, at the temperature of 20° C., the suspension was injected into the autoclave, thermostatted at 45° C., by slight ethylene overpressure. The temperature was then brought in about 5 minutes to the value requested for the polymerization and kept constant for the duration of the polymerization. The total pressure was kept constant by feeding an ethylene/1-butene mixture. The reaction was then interrupted by quick degassing of the monomers and the polymer obtained was washed at room temperature with distilled water first and thereafter with acetone, then it was dried in oven at 60° C. under nitrogen stream.

The polymerization conditions are reported in Table 1. The data relating to the characterization of the obtained polymer are reported in Table 2.

EXAMPLE 5

Ethylene/1-butene copolymerization in gas phase

It was worked according to the procedure described in example 4, but using 2.019 g of the pre-polymerized solid catalyst of example 2(B) without further addition of TIBAL.

The polymerization conditions are reported in Table 1. The data relating to the characterization of the obtained polymer are reported in Table 2.

EXAMPLE 6

(A) Preparation of a supported catalyst

It was worked according to the procedure described in example 2(A), but 224.2 g of rac-ethylene-bis(4.7-dimethylindenyl)zirconium dichloride instead of ethylene-bis-(indenyl)zirconium dichloride were used. 7.9 g of a product showing microspheroidal morphology was obtained, having the following composition: Al=9.6%, Cl=0.70%, Zr=0.44%.

EXAMPLE 7

Ethylene homopolymerization

Into a 4.25 liter steel autoclave, provided with agitator, manometer, temperature indicator, supplying system for the catalyst, feeding line of monomers and thermostatting jacket, purified by washing with propane at 70° C., 2.3 liters of propane and the amounts of ethylene and hydrogen indicated in Table 1 were introduced. The suspension of the catalyst was prepared as follows. Into a dropping funnel the solid catalyst of example 6 and a solution of aluminium triisobutyl in 10 ml of hexane (TIBAL) was introduced. After 5 minutes, at the temperature of 20° C., the suspension was injected into the autoclave, thermostatted at 45° C., by slight ethylene overpressure. The temperature was then brought over about 5 minutes to the value requested for the polymerization and maintained constant by feeding ethylene. Then the reaction was ceased by quick degassing of the monomers and the polymer obtained was dried in oven at 60° C. under nitrogen stream.

The polymerization conditions are reported in Table 1. The data relating to the characterization of the obtained polymer are reported in Table 2.

EXAMPLE 8

Ethylene/1-butene copolymerization

It was worked according to the procedure described in example 3, but using a 4.25 liter autoclave into which 2.3 liters of propane and the amounts of 1-butene, ethylene and hydrogen indicated in Table 1 were introduced. The suspension of the catalyst, prepared as described in example 7, was injected into the autoclave, thermostatted at 45° C., by slight ethylene overpressure.

The polymerization conditions are reported in Table 1. The data relating to the characterization of the obtained polymer are reported in Table 2.

EXAMPLE 9

Preparation of a functionalized polystyrenic support (A) Acylation

Into a 6 liter reactor equipped with a mechanical stirrer and a thermostatting system, 4300 ml of methylene chloride and 225 g of the polystyrenic resin prepared in example 1 were introduced. This was cooled to 10° C. and 580 g of previously ground $AlCl_3$ were rapidly added. Whilst maintaining the temperature at 10° C., 230 ml of acetyl chloride were added dropwise over 1 hour. The reaction mixture was kept stirred at 25° C. for a further 24 hours. The reaction mixture was cautiously poured into a suspension consisting of 2160 ml of distilled water, 2160 g of water and 2160 ml of 37% HCl solution. Once the addition was completed, it was left whilst stirring for a further 15 minutes, then the solid residue was filtered and repeatedly washed with distilled water and then acetone and then methanol. The product obtained was dried at 60° C.; 260 g of product was obtained. The IR spectra showed a band centred at 1680 $cm^{-1}$ relating to the carbonyl group.

(B) Reduction

In a 3 liter round bottomed flask equipped with a mechanical stirrer and a thermostatting system, 1060 ml of methanol and 260 g of the acylated resin prepared at point (A) was introduced. Whilst maintaining the temperature of the suspension below 35° C., a solution consisting of 138 g of $NaBH_4$, 170 ml of 20% NaOH and 1060 ml of distilled water was added over 2 hours. This was left to react for 48 hours at 25° C. and then 200 ml of acetone was slowly added to destroy the excess $NaBH_4$. The resin was then filtered and repeatedly sequentially washed with distilled water, acetone, methanol and acetone. This was then dried under vacuo at 60° C. for 24 hours. 234 g of product was obtained. The IR analysis showed a enlarged band centred at 3440 $cm^{-1}$, whilst the carbonyl band at 1680 had disappeared. The content of hydroxyl groups, determined by gas-volumetric titration with aluminium triethyl, is of 1.9 meq per gram of resin. The spherical shaped particles showed an average size of 150 μm with the following surface area and porosity characteristics: 327 $m^2/g$ and 0.7 ml/g with average pore diameter of 43 Å (B.E.T.), and 144 $m^2/g$ and 1.53 ml/g with pores of 212 Å (Hg).

EXAMPLE 10

(A) Preparation of a supported catalyst 100 ml of toluene and 5.45 g of the support prepared in example 9(B) were introduced into a 350 ml jacketed reactor equipped with a blade stirrer, thermometer, reflux condenser and a thermoregulator system. The suspension was thermostatted at −5° C. and 30 ml of a 1.04M solution of MAO (156 mg Al/g support) was added over 40 minutes. This was kept at −5° C. for 1 hour then heated to 30° C. and kept at this temperature for 1 hour and finally heated to 80° C. for 4 hours. The whitish suspension obtained was once again cooled to −10° C. and a solution of 50 ml of toluene and 246.1 mg of $EBIZrCl_2$ (9.2 mg Zr/g support) was added over 40 minutes. The orange coloured solution was subsequently heated to 0° C. and kept stirred for 30 minutes and then a further 2 hours at 30° C. After decanting the solid, the liquid was filtered and the residue subjected to two washings with 100 ml of toluene and one with 100 ml of anhydrous hexane and finally dried under vacuo at 25° C. 9.0 g of spherical particles was recovered, having the following composition: Zr=0.55%, Cl=1.38%, Al=9.5%.

(B) Pre-polimerization

It was worked according to the procedure described in example 2(B), but using 1.33 g of the supported catalyst prepared at point (A) of this example and continuing ethylene feeding for 5 hours. 6.1 g of pre-polymer was obtained.

EXAMPLE 11

Ethylene/1-butene copolymerization

A 2.5 l steel autoclave equipped with a blade magnetic stirrer, manometer, temperature indicator, system for loading the catalyst, feed line for the monomer and a thermostatting jacket, was purged through propane washing at 70° C. 5 mmols of TIBAL in 5 ml of hexane, 1260 ml of propane and the amounts of ethylene, propylene and hydrogen reported in Table 1 were introduced at room temperature and then the reactor was heated to 45° C. The catalytic suspension was prepared in a Schlenck tube with a discharge tap at the bottom. 5 mmols of TIBAL in 5 ml of hexane was added at a temperature of 25° C. and followed by 108 mg of supported catalyst from example 10(A). The reagents were contacted for 5 minutes and then the suspension was introduced into the autoclave by ethylene overpressure. The temperature was then raised to 50° C. and maintained constant by feeding a mixture of ethylene/1-butene in a molar ratio of 18. The polymerisation was interrupted by introducing 0.6 NL of CO into the autoclave after rapid cooling to 30° C. The reactor was then left to slowly degas and the polymer obtained was dried at 60° C. under vacuo.

The polymerization conditions are reported in Table 1. The data relating to the characterization of the obtained polymer are reported in Table 2.

EXAMPLE 12

Ethylene homopolymerization

A 1.35 l steel autoclave equipped with a blade magnetic stirrer, manometer, temperature indicator, system for loading the catalyst, feed line for the monomer and a thermostatting jacket, was purged through ethylene washing at 70° C. At room temperature 5 mmols of TIBAL in 700 ml of hexane, the amount of ethylene reported in Table 1 was introduced and then the reactor was heated to 75° C. The catalytic suspension was prepared in a Schlenck tube with a discharge tap at the bottom. 5 mmols of TIBAL in 5 ml of hexane was added at a temperature of 25° C. and followed by 390 mg of supported catalyst from example 10(A). The reagents were contacted for 5 minutes and then the suspension was introduced into the autoclave by ethylene overpressure. The temperature was then raised to 50° C. and maintained constant by feeding ethylene. The polymerisation was interrupted by introducing 0.6 NL of CO into the autoclave after rapid cooling to 30° C. The polymeric suspension was filtered and the polymer obtained was dried at 60° C. under vacuo.

The polymerization conditions are reported in Table 1. The data relating to the characterization of the obtained polymer are reported in Table 2.

EXAMPLE 13

Propylene homopolymerization

A 4.25 1 steel autoclave equipped with a blade magnetic stirrer, manometer, temperature indicator, system for loading the catalyst, feed line for the monomer and a thermostatting jacket, was purged through propylene washing at 70° C. At 40° C. in a light flow of propylene, 10 mmols of TIBAL in 10 ml of hexane and 204 mg of catalyst of example 10(A) were introduced. 4250 ml of propylene were then added and the temperature was raised to 50° C. The pressure was maintained constant by feeding propylene. After two hours the reactor was left to degas and the recuperated polymer was dried at 60° C. under vacuo. 18 g of polypropylene granules were obtained having the following characteristics:

| | |
|---|---|
| T.B.D. | 0.40 g/ml |
| intrinsic viscosity | 0.40 dl/g |
| DSC melting peak (II scanning) | 134° C. |
| heat of fusion (ΔH) | 79 J/g |
| xylene insolubles at 25° C. | 91.2 % |
| GPC Mw | 34900 g/mol |
| Mw/Mn | 2.2 |

EXAMPLE 14

Ethylene/1-butene copolymerization

It was worked according to the procedure described in example 11, but using 570 mg of the pre-polymerized catalyst of example 10(B) instead of the supported catalyst.

The polymerization conditions are reported in Table 1. The data relating to the characterization of the obtained polymer are reported in Table 2.

EXAMPLE 15

Preparation of a supported catalyst

Into a 350 ml jacketed reactor equipped with a blade magnetic stirrer, thermometer, reflux condenser and a thermoregulator system, 100 ml of toluene and 5.47 g of the support prepared in example 9(B) were introduced. The suspension was thermostatted at −10° C. and a solution, prereacted for 30 minutes at room temperature, consisting of 40 ml of toluene containing 1.85 g of MAO (157 mg Al/g support) and 243.4 mg of EBIZrCl$_2$ (9.7 mg Zr/g support) were added over 40 minutes. The orange coloured suspension was subsequently heated to 0° C. over 1 hour and kept stirred for 30 minutes and then 35° C. for 2 hours. After decanting the solid, the liquid was filtered and the residue subjected to two washings with 100 ml of toluene and one with 100 ml of anhydrous hexane and finally dried under vacuo at 25° C. 10.8 g of spheroidal particles was recovered, having the following composition: Zr=0.48%, Al=7.7%, solvent=13.7%.

EXAMPLE 16

Ethylene/1-butene copolymerization

It was worked according to the procedure described in example 11, but using 121 mg of the supported catalyst prepared in example 15.

The polymerization conditions are reported in Table 1. The data relating to the characterization of the obtained polymer are reported in Table 2.

EXAMPLE 17

Preparation of a supported catalyst

Into a 350 ml jacketed reactor equipped with a blade magnetic stirrer, thermometer, reflux condenser and a thermoregulator system, 100 ml of toluene and 5.6 g of the support prepared in example 9(B) were introduced. The suspension was thermostatted at −10° C. and 20 ml of a 0.83M MAO solution were added over 30 minutes. This was kept at −10° C. for 30 minutes then heated to 30° C. and kept at this temperature for 1 hour. The whitish suspension obtained was once again cooled to 0C and a prereacted solution consisting of 30 ml of toluene and 261.4 mg of EBIZrCl$_2$ (9.2 mg Zr/g support) and 0.88 mg of MAO, was added over 40 minutes. The orange coloured solution was kept stirred for 1 hour at 0° C. Slowly (over 2 hours) the suspension was heated to 30° C. and maintained at this temperature for 1 hour. After decanting the solid, the liquid was filtered and the residue subjected to two washings with 100 ml of toluene and one with 100 ml of anhydrous hexane and finally dried under vacuo at 25° C. 5.6 g of spheroidal particles was recovered, having the following composition: Zr=0.64%, Cl=1.25%; Al=9.0%.

EXAMPLE 18

Ethylene/1-butene copolymerization

It was worked according to the procedure described in example 11, but using 165 mg of the supported catalyst prepared in example 17.

The polymerization conditions are reported in Table 1. The data relating to the characterization of the obtained polymer are reported in Table 2.

EXAMPLE 19

Preparation of a supported catalyst 100 ml of toluene and 10.15 g of the support prepared in example 9(B) were introduced into a 350 ml jacketed reactor equipped with a blade stirrer, thermometer, reflux condenser and a thermoregulator system. The suspension was thermostatted at −10° C. and 50 ml of a 1.16M solution of MAO (154 mg Al/g support) was added over 50 minutes. This was kept at −10° C. for 1 hour then heated to 0° C. and kept at this temperature for 1 hour, at 30° C. for 1 hour and finally heated to 80° C. for 4 hours. The whitish suspension obtained was left to decant, the liquid separated and the solid support was subjected to two washings with 100 ml of toluene and one with 100 ml of anhydrous hexane and finally dried under vacuo at 25° C. After drying 13.8 g of spherical particles was recovered, having the following composition: Al=8.95%, solvent=7.6%.

Using the same apparatus, 5.6 g of the resin treated with MAO were dispersed in 100 ml of anhydrous toluene and cooled to 0° C. A solution consisting of 50 ml of toluene and 228 mg of EBDMIZrCl$_2$ (7.8 mg Zr/g support) were added over 1 hour. The purply-red coloured solution was left at 0° C. for 1 hour and subsequently heated to 30° C. and kept stirred for 2 hours. After decanting the solid, the liquid was filtered and the residue subjected to two washings with 100 ml of toluene and one with 100 ml of anhydrous hexane and finally dried under vacuo at 25° C. 5.4 g of spheroidal particles was recovered, having the following composition: Zr=0.44%, Cl=1.09%, Al=8.1%.

EXAMPLE 20

Ethylene/1-hexene copolymerization

A 2.5 l steel autoclave equipped with a blade magnetic stirrer, manometer, temperature indicator, system for loading the catalyst, feed line for the monomer and a thermostatting jacket, was purged through propane washing at 70° C. 5 mmols of TIBAL in 5 ml of hexane, 1260 ml of propane, 277 ml of 1-hexene and the amounts of ethylene and hydrogen reported in Table 1 were introduced at room temperature and then the reactor was heated to 55° C. The catalytic suspension was prepared in a Schlenck tube with a discharge tap at the bottom. 5 mmols of TIBAL in 5 ml of hexane was added at a temperature of 25° C. and followed by 150 mg of the supported catalyst prepared in example 19. The reagents were contacted for 5 minutes and then the suspension was introduced into the autoclave by ethylene overpressure. The temperature was then raised to 60° C. and maintained constant during the polymerisation. The total pressure was kept constant by feeding ethylene. The polymerisation was interrupted by introducing 0.6 NL of CO into the autoclave after rapid cooling to 30° C. The reactor was then left to slowly degas and the polymer obtained was dried at 60° C. under vacuo.

The polymerization conditions are reported in Table 1. The data relating to the characterization of the obtained polymer are reported in Table 2.

EXAMPLE 21

Preparation of a supported catalyst 300 ml of toluene and 30.2 g of the support prepared in example 9(B) were introduced into a 750 ml jacketed reactor equipped with a blade stirrer, thermometer, reflux condenser and a thermoregulator system. The suspension was thermostatted at −10° C. and 200 ml of a 0.9M solution of MAO (160 mg Al/g support) was added over 70 minutes. This was kept at −10° C. for 1 hour then heated to 0° C. and kept at this temperature for 1 hour, at 30° C. for 1 hour and finally heated to 80° C. for 4 hours. The whitish suspension obtained was left to decant, the liquid separated and the solid was subjected to two washings with 200 ml of toluene and one with 200 ml of anhydrous hexane. After drying 66 g of spheroidal particles were recovered: having the following composition: Al=7.5%, solvent=27%.

Using the same apparatus, 10.6 g of the resin treated with MAO were dispersed in 300 ml of anhydrous toluene and cooled to 0° C. A solution consisting of 50 ml of toluene and 176.8 mg of EBTHIZrCl$_2$ (7.7 mg Zr/g support) were added over 1 hour. The solution was left at 0° C. for 30 minutes and subsequently heated to 30° C. and kept stirred for 2 hours. After decanting the solid, the liquid was filtered and the residue subjected to two washings with 100 ml of toluene and one with 100 ml of anhydrous hexane and finally dried under vacuo at 25° C. 8.7 g of spheroidal particles was recovered, having the following composition: Zr=0.40%, Cl=0.92%, Al=7.8%.

EXAMPLE 22

Ethylene/propylene copolymerization

Into a 4.25 liter steel autoclave, provided with agitator, manometer, temperature indicator, supplying system for the catalyst, feeding lines of the monomers and thermostatting jacket, purified by washing with propylene at 70° C, 2 liters of propylene and the ethylene amounts indicated in Table 3 were introduced at room temperature. The suspension of the catalyst was prepared as described in example 4, but using 220 mg of the supported catalyst prepared in example 21, and injected into the autoclave at room temperature by a steel vial and under propylene pressure. The temperature was then brought in about 5 minutes to the value requested for the polymerization and kept constant for the polymerization time. The pressure was maintained constant by feeding ethylene. Thereafter, the reaction was interrupted by a quick degassing of the monomers and the polymer obtained was dried in oven at 60° C. under nitrogen stream.

The polymerization conditions and the data relating to the characterization of the obtained polymer are reported in Table 3.

EXAMPLE 23

Ethylene/propylene copolymerization

It was worked according to the procedure described in example 22, but using 20 mg of the supported catalyst of example 21.

The polymerization conditions and the data relating to the characterization of the obtained polymer are reported in Table 3.

EXAMPLE 24

Preparation of a functionalized polystyrenic support (A) Cloromethylation

In a 500 ml 3-neek flask supplied with mechanical stirrer and water refrigerator were placed 30 g of cross-linked polystyrene having the following characteristics:

| | |
|---|---|
| Average particle size | 248 μm |
| Surface area (B.E.T.) | 891 m$^2$/g |
| (Hg) | 112 m$^2$/g |
| Porosity (B.E.T.) | 2.21 ml/g |
| (Hg) | 1.32 ml/g |

17.25 g of trioxane, 8.6 g of ZnCl$_2$, 250 ml of 37% acqueous HCl and 50 ml of dioxane. A rapid stream of HCl gas was poured through the reaction mixture and it was kept out at 80° C. for 4 hour and at 100° C. for 3 hours. Than, the suspension was cooled to room temperature and washed several time with water and Na$_2$CO$_3$ water solution. Part of the solid compound was dried under vacuum at 60° C. and the chlorine content was detected resulting 6.1 wt. %.

(B) Hydrolysis

The remaining part of the wet polymer, 40 g of Na$_2$CO$_3$, 360 ml of dioxane and 240 ml of distilled water were placed in a 1 l autoclave. The autoclave was closed and the reaction was carried out at 160–162° C., reaching a pressure of 7.5–8 bar. after 5 hours, the polymer was filtered at room temperature and washed many times with water, than with a mixture 1—1 water-acetone, than with acetone and finally with methanol. After drying under vacuum at 60° C., 32 g of polymer were recovered. The following characteristics were found:

| | |
|---|---|
| Chlorine content | 1.6 wt % |
| Functional groups | 1.22 meq/g |
| Average particle size | 240 μm |
| Surface area (B.E.T.) | 621 m$^2$/g |
| (Hg) | 118 m$^2$/g |
| Porosity (B.E.T.) | 1.34 ml/g |

-continued

| (Hg) | 1.18 ml/g |
| IR analysis | broad peak centered at 2400 cm$^{-1}$ (OH) |

EXAMPLE 25

Preparation of a supported catalyst 100 ml of toluene and 5.5 g of the support prepared in example 24(B) were introduced into a 350 ml jacketed reactor equipped with a blade stirrer, thermometer, reflux condenser and a thermoregulator system. The suspension was thermostatted at −10° C. and 50 ml of a 0.61M solution of MAO (151 mg Al/g support) was added over 60 minutes. This was kept at −10° C. for 1 hour then heated to 0° C. and kept at this temperature for 1 hour, at 30° C. for 1 hour and finally heated to 80° C. for 3 hours. The whitish suspension obtained was left to decant, the liquid separated and the solid support was subjected to two washings with 100 ml of toluene and then dispersed once again in 150 ml of anhydrous toluene. After cooling to 0° C., a solution consisting of 50 ml of toluene and 230 mg of EBIZrCl$_2$ (9.1 mg Zr/ g support) were added over 1 hour. The reddish coloured solution was left at 0° C. for 1 hour and subsequently heated to 30° C. and kept stirred for 2 hours. After decanting the solid, the liquid was filtered and the residue subjected to two washings with 100 ml of toluene and one with 100 ml of anhydrous hexane and finally dried under vacuo at 25° C. 6.4 g of spheroidal particles was recovered, having the following composition: Zr=0.54%, Cl=1.48%, Al=5.82%.

EXAMPLE 26

Ethylene/1-butene copolymerization

It was worked according to the procedure described in example 11, but using 538 mg of the supported catalyst prepared in example 25.

The polymerization conditions are reported in Table 1. The data relating to the characterization of the obtained polymer are reported in Table 2.

EXAMPLE 27

Preparation of a functionalized polystyrenic support (A) Tert-butylated polystyrene Into a 2 liter glass reactor, equipped with thermometer, reflux condenser, blade stirrer and thermoregulation system, an aqueous solution consisting of:

400 ml of distilled water 36.2 ml of a ROAGIT SVM (Rhom) 5 wt. % solution in water 2.25 g of PROLIT C10 (Caffaro)

0.45 g of sodium chloride was introduced under nitrogen atmosphere. The whole was stirred at 400 rpm at room temperature for 1 hour. Thereafter an organic solution consisting of 225-ml of n-octane 75 ml of toluene 120 ml of 55 wt % of divinylbenzene in ethylvinylbenzene 45 ml of p-tert-butoxystyrene (Hokko Chemical Industry)

3.13 g of 75 wt % dibenzoylperoxide in water was introduced.

The temperature of the reactor was raised to 80° C. over 1 hour, kept for 8 hours, then cooled to 50° C. and 700 ml of distlled water were added. The solid product was separated by filtration and subjected to repeated washings with distilled water, extraction with methanol at 50° C. and, subsequently, drying at 100° C. and 1 mmHg of residual pressure.

108 g of product showing microspheroidal morphology was obtained. The product has the following characteristics:

| Surface area (B.E.T.) | 411 m$^2$/g |
| (Hg) | 86 m$^2$/g |
| Porosity (B.E.T.) | 0.85 ml/g |
| (Hg) | 0.66 ml/g |
| Average radius pore | 41 Å |
| Average particle size | 170 μm |
| IR analysis | peak at 1240 cm$^{-1}$ (Aryl-O-t-Bu) |

(B) Hydrolysis

Into a 500 ml glass reactor, provided with thermometer, reflux condenser, blade stirrer and thermoregulation system, 200 ml of hydrochloric acid (37% solution) and 36.5 g of the support prepared at point (A) of this example were introduced. The mixture was thermostatted at 90° C. and kept stirred for 8 hours. The solid was separated and added of 200 ml of fresly HCl and kept at 90° C. for a further 4 hours. After filtration, the recovered solid was washed with water till a pH=7 of the washing, then washed with acetone and dried under vacum at 60° C. 34.7 g of spherical particle were recovered, having 1.5 meq/g of functional groups. The IR analysis shows a sharp peak at 3450 cm$^{-1}$ and the peak at 1240 cm$^{-1}$ disappers.

EXAMPLE 28

Preparation of a supported catalyst 100 ml of toluene and 5.3 g of the polystyrenic support prepared in example 27(B) were introduced into a 350 ml jacketed reactor equipped with a blade stirrer, thermometer, reflux condenser and a thermoregulator system. The suspension was thermostatted at 0° C. and 33 ml of a toluene solution containing 5 g of triethyl aluminium. Once the addition was completed, the solution was heated to 25° C. and kept stirred for 1 hour. After filtering the liquid phase, the solid was washed in toluene and once again dispersed in 100 ml toluene. The suspension was then thermostatted at −5° C. and 25 ml of a 1.37M solution of MAO (176 mg Al/g support) was added over 20 minutes. This was heated to 0° C. and kept at this temperature for 1 hour, at 30° C. for 1 hour and finally heated to 80° C. for 4 hours. After cooling to −10° C., 50 ml of toluene and 218 mg of EBIZrCl$_2$ (9.0 mg Zr/g support) was added over 1 hour. The reddish coloured solution was left at 0° C. for 1 hour and subsequently heated to 30° C. and kept stirred for 2 hours. After decanting the solid, the liquid was filtered and the residue subjected to two washings with 100 ml of toluene and one with 100 ml of anhydrous hexane and finally dried under vacuo at 25° C. 6.0 g of spheroidal particles was recovered, having the following composition: Zr=0.42%, Cl=1.1%, Al=11. 9%.

EXAMPLE 29

Ethylene/1-butene copolymerization

It was worked according to the procedure described in example 11 but using 185 mg of the supported catalyst prepared in example 28.

The polymerization conditions are reported in Table 1. The data relating to the characterization of the obtained polymer are reported in Table 2.

EXAMPLE 30

Preparation of a functionalized polystyrenic support 100 ml of cyclohexane, 13.8 g of the polystyrenic resin prepared in example 1, and 17.8 ml of N,N,N',N'-tetramethyl ethylene diamine (TMEDA) were introduced into a 350 ml jacketed reactor maintained in an inert atmosphere ($N_2$), equipped with a blade stirrer, thermometer, reflux condenser and a thermoregulator system. Maintaining the temperature of the suspension at 20–22° C., 100 ml of a solution of 1.6M n-butyl lithium was fed over 1.5 hours. The suspension changed from yellow through orange and finally red. This was then heated to 65° C. and kept at this temperature for 4.5 hours. the solid was then filtered, whilst keeping under an inert atmosphere, and subjected to two washings with 100 ml of cyclo-hexane and then 150 ml of tetrahydrofuran (THF) was added previously saturated with $CO_2$. Then about 300 g of solid $CO_2$ was directly added to the suspension whilst stirring continuously. The colour of the solution became whitish. The suspension was left to react overnight, then filtered and the solid was subjected to repeated washings with a solution THF/HCl, methanol/HCl, methanol and then finally dried under vacuo at 40° C. 14 g of spherical resin was obtained having the following characteristics:

| Functional groups | 1.2 meq/g |
|---|---|
| Average radius pore | 37 Å |
| Average particle size | 150 μm |
| Surface area (B.E.T.) | 303 m$^2$/g |
| (Hg) | 129 m$^2$/g |
| Porosity (B.E.T.) | 1.12 ml/g |
| (Hg) | 1.69 ml/g |
| IR analysis | peak at 1700 cm$^{-1}$ (—C=O) |
| | peak at 3400 cm$^{-1}$ (—OH) |

EXAMPLE 31

Preparation of a supported catalyst 100 ml of toluene and 5.7 g of the support from example 30 were introduced into a 350 ml jacketed reactor equipped with a blade stirrer, thermometer, reflux condenser and a thermoregulator system. The suspension was thermostatted at 0° C. and 10 ml of a toluene solution containing 1.5 g of triethyl aluminium. Once the addition was completed, the solution was heated to 80° C. and kept stirred for 1 hour. After filtering the liquid phase, the solid was washed in toluene and once again dispersed in 100 ml toluene. The suspension was then thermostatted at 0C and 50 ml of a 0.64M solution of MAO (153 mg Al/g support) was added over 40 minutes. This was kept at 0° C. for 1 hour, heated to 30° C. for 1 hour and finally 80° C. for 4 hours. After cooling to room temperature, the suspension was filtered and once again 100 ml of anhydrous toluene was added. The suspension was cooled to 0° C. and a solution consisting of 40 ml of toluene and 212 mg of EBIZrCl$_2$ (8,1 mg Zr/g support) was added. The reddish coloured solution was heated to 30° C. and kept stirred for 2 hours. After decanting the solid, the liquid was filtered and the residue subjected to two washings with 100 ml of toluene and one with 100 ml of anhydrous hexane and finally dried under vacuo at 25° C. 5.9 g of spheroidal particles was recovered, having the following composition: Zr=0.2%, Cl=0.46%, Al=7.2%.

EXAMPLE 32

Ethylene/1-butene copolymerization

It was worked according to the procedure described in example 3 but using 370 mg of the supported catalyst prepared in example 31.

The polymerization conditions are reported in Table 1. The data relating to the characterization of the obtained polymer are reported in Table 2.

EXAMPLE 33

Preparation of a functionalized polystyrenic support (A) Methylated polystyrene

Into a 2 liter glass reactor, equipped with thermometer, reflux condenser, blade stirrer and thermoregulation system, an aqueous solution consisting of:

400 ml of distilled water 30 ml of a ROAGIT SVM (Rhom) 5 wt. % solution in water 2.25 g of PROLIT C10 (Caffaro)

0.45 g of sodium chloride was introduced under nitrogen atmosphere. The whole was stirred at 400 rpm at room temperature for 1 hour. Thereafter an organic solution consisting of 225 ml of n-octane 75 ml of toluene 120 ml of 55 wt % of divinylbenzene in ethylvinylbenzene 31.5 ml of m and p-methylstyrene 3.13 g of 75 wt % dibenzoylperoxide in water was introduced.

The temperature of the reactor was raised to 80° C. over 1 hour, kept at this temperature for 9 hours, then cooled to 50° C. and 700 ml of distilled water was added. The solid product was separated by filtration and subjected to repeated washings with distilled water, HCl (5 wt %) solution, distilled water and extraction with methanol at 50° C. Subsequently, the solid was dried at 100° C. and 1 mmHg of residual pressure. 117 g of product showing microspheroidal morphology was obtained. The product has the following characteristics:

| Average radius pore | 69 Å |
|---|---|
| Average particle size | 150 μm |
| Surface area (B.E.T.) | 495 m$^2$/g |
| (Hg) | 137 m$^2$/g |
| Porosity (B.E.T.) | 1.72 ml/g |
| (Hg) | 1.87 ml/g |

(B) Acetylation

Into a 1500 ml glass reactor, provided with thermometer, reflux condenser, blade stirrer and thermoregulation system, 1000 ml of acetic acid and 20 g of the support prepared at point (A) of this example were introduced. Slowly 56 g of Mn(OAc)$_3$·3H$_2$O were added. Maintaining the temperature below 40° C., 100 ml of sulphuric acid (96%) were dropped into the stirred suspension. The mixture was then thermostatted at 45° C and kept stirred for 4 hours. After filtration, the recovered solid was washed with a NaHCO$_3$ solution, water, methyl alcohol, finally with acetone and dried under vacuo at 80° C. for 5 hours. 23 g of spherical particle were recovered. The IR analysis show a peak at 1740 cm$^-$ (-C=O) and a peak at 1220 cm$^{-1}$ (—OAc).

(C) Hydrolysis

Into a 1 l glass reactor, provided with thermometer, reflux condenser, blade stirrer and thermoregulation system, 500 ml of toluene, 200 ml of 40 wt % KOH solution, the product prepared at point (B) of this example and 10 ml of 40 wt % Bu$_4$NOH solution in water, were introduced. The mixture was thermostatted at 85° C. and kept stirred for 21 hours. The solid was separated and washed with 300 ml of a HCl/water solution, then washed with distilled water, methyl alcohol, acetone and dried under vacuo at 80° C. 19 g of spherical particle were recovered.

The IR analysis showed a broad peak at 3400 cm$^{-1}$ and the peaks at 1740 and 1220 cm$^{-1}$ had totally disappeared. The titration with aluminium triethyl indicated 1.5 meq/g of —OH group.

EXAMPLE 34

Preparation of a supported catalyst 100 ml of toluene and 3.9 g of the support prepared in example 33(C) were introduced into a 350 ml jacketed reactor equipped with a blade stirrer, thermometer, reflux condenser and a thermoregulator system. The suspension was thermostatted at −10° C. and 50 ml of a 0.51M solution of MAO (178 mg Al/g support) was added over 20 minutes. This was kept at −10° C. for 1 hour whilst stirring, heated to 0° C. for 1 hour, 30° C. for 1 hour and finally 80° C. for 4 hours. The suspension was filtered, washed with 100 ml of toluene and once again 100 ml of anhydrous toluene was added. After cooling to 0° C., a solution consisting of 50 ml of toluene and 194 mg of EBIZrCl$_2$ was added over 1 hour. The reddish coloured solution was left at 0° C. for 1 hour and then subsequently heated to 30° C. and kept stirred for 2 hours. After decanting the solid, the liquid was filtered and the residue subjected to two washings with 100 ml of toluene and one with 100 ml of anhydrous hexane and finally dried under vacuo at 25° C. 6.5 g of spheroidal particles was recovered, having the following composition: Zr=0.55%, Cl=1.1%, Al=10.2%.

EXAMPLE 35

Ethylene/1-butene copolymerization

It was worked according to the procedure described in example 11 but using 1085 mg of the supported catalyst prepared in example 34.

The polymerization conditions are reported in Table 1. The data relating to the characterization of the obtained polymer are reported in Table 2.

EXAMPLE 36 (comparison)

Preparation of a supported catalyst 100 ml of anhydrous toluene and 5.15 g of the polystyrenic resin prepared in example 1 were introduced into a 350 ml glass reactor, provided with thermometer, reflux condenser, blade stirrer and thermoregulation system. The mixture, thermostatted at 0° C. and kept under stirring, was added with 40 ml of a 0.74M toluene solution of methylalumoxane (MAO). This was reacted at a temperature of 0° C. for 1 hour, then at a temperature of 30° C. for 1 hour, then at a temperature of 80° C. for 4 hours. After having cooled to 25° C., 50 ml of a toluene solution containing 196.7 mg of ethylene-bis(indenyl)zirconium dichloride were added within 30 minutes. The temperature was raised to 30° C. whilst keeping stirred for 2 hours. A reddish solution was obtained; this was allowed to decant, thus obtaining a precipitate and a yellowish solution which was removed by drainage. The precipitate was repeatedly washed with anhydrous toluene and thereafter dried under vacuum. 6 g of product showing microspheroidal morphology were obtained, having the following composition: Zr=0.26%, Cl=0.2%, Al=6.2%.

EXAMPLE 37 (comparison)

Ethylene/1-butene copolymerization

It was worked according to the procedure described in example 8, but using 478 mg of the supported catalyst prepared in example 36 (comparison).

The polymerization conditions are reported in Table 1. The data relating to the characterization of the obtained polymer are reported in Table 2.

EXAMPLE 38 (comparison)

Preparation of a functionalized polystyrenic support 285 ml of methylene chloride and 16 g of a polystyrenic resin (Fluka product 4% DVB) were introduced into a 750 ml reactor equipped with a mechanical stirrer and a thermostatting system. This was cooled to 10° C. and 41 g of aluminium trichloride in finely divided powder form were rapidly added. Maintaining the internal reactor temperature at 10° C., 15.5 ml of acetyl chloride were added dropwise over 20 minutes, the reaction mixture was kept stirred at 25° C. for a further 24 hours and then cautiously poured into a suspension consisting of 150 ml of hydrochloric acid (37%) and 200 g of crushed ice. Once the addition was completed it was left whilst stirring for a further 30 minutes and, after filtration, the solid was repeatedly washed with distilled water, methanol, and acetone. The obtained product was then dried at 60° C. under vacuo. The solid product previously obtained was introduced, together with 75 ml of methanol, into a 750 ml reactor equipped with a mechanical stirrer and a thermostatting system. After thermostatting at 30° C., a solution consisting of 9.2 g of NaBH$_4$, 11.5 ml of NaOH (20%) and 70 ml of distilled water was added. This was left to react at 35° C. for 72 hours, then slowly 100 ml of acetone was added to destroy the excess NaBH$_4$. The resin was then filtered and repeatedly washed with distilled water, acetone, methanol and acetone. This was then dried for 4 hours at 40° C. 19 g of spherical product was obtained, having the following characteristics:

| Functional groups | 0.2 meq/g |
|---|---|
| Surface area (B.E.T.) (Hg) | non detectable 0.14 m$^2$/g |
| Porosity (B.E.T.) (Hg) | non detectable 0.01 ml/g |
| Average particle size | 110 μm |
| IR analysis | peak at 1701 cm$^{-1}$ (—C=O) broad peak at 3400 cm$^{-1}$ (—OH) |

EXAMPLE 39 (comparison)

Preparation of a supported catalyst

Into a 350 ml jacketed reactor equipped with a blade magnetic stirrer, thermometer, reflux condenser and a thermoregulator system, 100 ml of toluene and 5.6 g of the polystyrenic support prepared in example 38 (comparison) were introduced. The suspension was thermostatted at −10° C. and 50 ml of 0.68 solution of MAO (166 mg Al/g support) were added over 60 minutes. This was kept at −10° C. for 1 hour, heated to 0° C. for 1 hour, 30° C. for 1 hour and finally 80° C. for 3 hours. The suspension obtained was left to decant, the liquid separated and the solid subjected to two washings with 100 ml of toluene and once again dispersed in 100 ml of anhydrous toluene. After cooling to 0° C., a solution consisting of 50 ml of toluene and 221 mg of EBIZrCl$_2$ was added over 1 hour. The reddish coloured solution was left at 0° C. for 1 hour and then subsequently heated to 30° C. and kept stirred for 2 hours. After decanting the solid, the liquid was filtered and the residue subjected to two washings with 100 ml of toluene and one with 100 ml of anhydrous hexane and finally dried under vacuo at 25° C. 5.0 g of spheroidal particles was recovered, having the following composition: Zr=0.09%, Cl=0.08%, Al=1.69%.

EXAMPLE 40 (comparison)

Ethylene/1-butene copolymerization

It was worked according to the procedure described in example 11, but using 1460 mg of the supported catalyst prepared in example 39 (comparison).

The polymerization conditions are reported in Table 1. The data relating to the characterization of the obtained polymer are reported in Table 2.

TABLE 1

| Example | catalyst (mg) | TIBAL (mmol) | α-olefin type | α-olefin (ml) | ethylene partial pressure (bar) | hydrogen partial pressure (bar) | time (min) | temperature (° C.) | Yield (g) | Activity (g/gcat) |
|---|---|---|---|---|---|---|---|---|---|---|
| 3 | 160 | 5 | 1-butene | 181 | 165 | 0.05 | 120 | 50 | 174 | 1088 |
| 4 | 323 | 5 | 1-butene | 4.95* | 25.6 | 0.01 | 120 | 50 | 130 | 402 |
| 5 | 2019# | — | 1-butene | 2.55* | 25.6 | 0.01 | 60 | 50 | 72 | 204 |
| 7 | 235 | 10 | — | — | 8.12 | 0.04 | 60 | 50 | 111 | 472 |
| 8 | 157 | 10 | 1-butene | 517 | 16.5 | 0.05 | 120 | 50 | 232 | 1474 |
| 11 | 108 | 10 | 1-butene | 163 | 15.9 | — | 240 | 50 | 250 | 2300 |
| 12 | 390 | 10 | — | — | 9.6 | — | 120 | 80 | 110 | 281 |
| 16 | 121 | 10 | 1-butene | 163 | 15.9 | — | 240 | 50 | 157 | 1293 |
| 18 | 165 | 10 | 1-butene | 163 | 15.9 | — | 240 | 50 | 155 | 939 |
| 20 | 150 | 10 | 1-hexene | 277 | 14.4 | 0.19 | 120 | 60 | 386 | 2563 |
| 26 | 538 | 10 | 1-butene | 163 | 15.9 | — | 240 | 50 | 274 | 509 |
| 29 | 185 | 10 | 1-butene | 163 | 15.9 | — | 240 | 50 | 204 | 1102 |
| 32 | 370 | 10 | 1-butene | 181 | 16.5 | 0.05 | 120 | 50 | 102 | 273 |
| 35 | 1085 | 15 | 1-butene | 163 | 15.9 | — | 240 | 50 | 96 | 88 |
| 37 (comp.) | 478 | 10 | 1-butene | 581 | 16.5 | 0.05 | 60 | 50 | 389 | 814 |
| 40 (comp.) | 1460 | 10 | 1-butene | 163 | 15.9 | — | 240 | 50 | 15 | 10 |

*mol % of the 1-butene in the gas phase.
pre-polymerized catalyst

TABLE 2

| Example | α-olefin (wt. %) | I.V. (dl/g) | absolute density (g/ml) | DSC Tm (° C.) | DSC ΔH (J/g) | Tamped BD (g/ml) | Poured BD (g/ml) | Remarks |
|---|---|---|---|---|---|---|---|---|
| 3 | 17 | 0.86 | 0.8985 | 88 | 68 | 0.45 | 0.41 | granules |
| 4 | 16 | 1.11 | 0.9100 | 72 | 69 | 0.38 | 0.35 | " |
| 5 | 6.3 | 1.35 | 0.9310 | 110 | 115 | 0.41 | 0.38 | " |
| 7 | — | 3.25 | n.d. | 134 | 166 | 0.44 | 0.39 | " |
| 8 | 13 | 1.92 | 0.9062 | 98 | 71 | 0.45 | 0.41 | " |
| 11 | 14.6 | 1.38 | 0.9030 | 87 | 70 | 0.43 | 0.39 | spheres |
| 12 | — | 2.26 | — | 133 | 186 | 0.33 | 0.28 | " |
| 16 | 14.8 | 1.37 | 0.9056 | 90 | 83 | 0.45 | 0.39 | " |
| 18 | 14.5 | 0.86 | 0.9060 | 88 | 82 | 0.33 | 0.28 | " |
| 20 | 12.7* | 2.37 | 0.9060 | 101 | 84 | 0.46 | 0.41 | granules |
| 26 | 11.9 | 1.65 | 0.9112 | 94 | 88 | 0.30 | 0.28 | spheres |
| 29 | 14.1 | 1.51 | 0.9043 | 91 | 75 | 0.36 | 0.33 | granules |
| 32 | 16 | 0.89 | 0.9110 | 86 | 85 | 0.53 | 0.48 | aferes |
| 35 | 13.2 | 1.12 | 0.9085 | 95 | 63 | 0.45 | 0.38 | " |
| 37 (comp.) | 17.2 | 0.91 | 0.9024 | 92 | 62 | 0.24# | 0.21# | 15% powder, 85% agglomerate on the wall reactor |
| 40 (comp.) | n.m. | 2.11 | n.m. | 96 | 47 | n.d | n.d | agglomerate |

*1-hexene comonomer
referred to the part in form of powder
n.m.—not measured
n.d.—non detectable

TABLE 3

| Example | catalyst (mg) | TIBAL (mmol) | ethylene partial pressure (bar) | time (min) | temperature (° C.) | Yield (g) | Activity (g/gcat) | propylene (wt. %) | DSC Tm (° C.) | DSC ΔH (J/g) | Remarks |
|---|---|---|---|---|---|---|---|---|---|---|---|
| 24 | 221.4 | 10 | 12.6 | 60 | 50 | 806 | 3640 | 60 | — | 0 | divided spheres |
| 25 | 20.0 | 10 | 10.5 | 120 | 50 | 164 | 8200 | 44 | — | 0 | divided spheres |

What is claimed is:

1. Process for the preparation of a supported catalyst for the polymerization of olefins comprising:

(A) a porous organic support functionalized with between 3.3 and 6 meq/g of groups having active hydrogen atoms;

(B) at least one organo-metallic compound of aluminium containing at least one heteroatom selected from the group consisting of oxygen, nitrogen and sulfur; and (C) at least one compound of a transition metal selected from those groups of IVb, Vb or VIb of the Periodic Table of the Elements, containing at least one cyclopentadienyl ligand; comprising the steps of:

contacting in an inert solvent said porous organic support (A) and said organo-metallic compound of aluminium (B);

thereafter contacting the thus obtained product with said compound of a transition metal (C); and recovering the supported catalyst by removing the solvent.

2. Process according to claim 1 wherein the porous organic support is pre-contacted with at least an aluminium alkyl compound of formula (VI):

wherein $R^5$ is selected from a group consisting of alkyl, alkenyl, aryl, alkaryl and aralkyl radicals containing from 1 to 10 carbon atoms, X is selected from the group consisting of hydrogen and halogen atoms, and q is an integer between 1 and 3.

3. Process according to claim 2 wherein the aluminium alkyl compound is triisobutyl aluminium.

4. Process according to claim 1 wherein the porous organic support is in the form of particles having microspheroidal morphology with a diameter comprised between 5 and 1000 µm.

5. Process according to claim 1 wherein the functional group of the porous organic support is selected from the group consisting of hydroxy, primary amino, secondary amino, sulphonic, carboxylic, amido, N-monosubstituted amido, sulphonamido, N-monosubstituted sulphonamido, sulphydryl, imido and hydrazido groups.

6. Process according to claim 1 wherein the porous organic support is a partially cross-linked styrenic polymer.

7. Process according to claim 1 wherein the transition metal compound is selected from cyclopentadienyl compounds of formula (I):

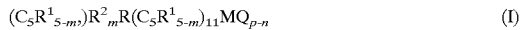

wherein M is selected from the group consisting of Ti, Zr, Hf and V; $C_5R^1_{5-m}$ are cyclopentadienyl rings equally or differently substituted; substituents $R^1$, same or different from each other, are selected from the group consisting of hydrogen, alkyl, alkenyl, aryl, alkaryl and aralkyl radicals containing from 1 to 20 carbon atoms which can also contain Si or Ge atoms or $Si(CH_3)_3$ groups, or also two or four substituents $R^1$ of a same cyclopentadienyl group can form one or two rings having from 4 to 6 carbon atoms; $R^2$ is a group which bridge links the two cyclopentadienyl rings and is selected from the group consisting of $CR^3_2$, $C_2R^3_4$, $SiR^3_2$, $Si_2R^3_4$, $GeR^3_2$, $R^3_2SiCR^3_2$, $NR^1$ and $PR^1$, which substituents $R^3$, same or different from each other, which are $R^1$ or two or four substituents $R^3$ can give one or two rings having from 3 to 6 carbon atoms; substituents Q, same or different from each other, are selected from the group consisting of halogen, hydrogen, OH, SH, $R^1$, $OR^1$, $SR^1$, $NR^1_2$ and $PR^1_2$; and m is 0 or 1; n is 0 or 1; being 1 when m=1; p is 2 or 3.

8. Process according to claim 1 wherein the organic metallic compound of aluminium is an alumoxane.

9. Process for the preparation of a supported catalyst for the polymerization of olefins comprising:
(A) a porous organic support functionalized with between 3.3 and 6 meq/g of groups having active hydrogen atoms;
(B) at least one organo-metallic compound of aluminium containing at least one heteroatom selected from the group consisting of oxygen, nitrogen and sulfur; and
(C) at least one compound of a transition metal selected from those of groups IVb, Vb or VIb of the Periodic Table of the Elements, containing at least one cyclopentadienyl ligand;
comprising the steps of:
contacting in an inert solvent said organo-metallic compound of aluminium (B) and said compound of a transition metal;

thereafter contacting the thus obtained product with said porous organic support (A); and
recovering the supported catalyst by a removing the solvent.

10. Process according to claim 9 wherein the organic support is pre-contacted with at least an aluminium alkyl compound of formula (VI):

wherein $R^1$ is selected from a group consisting of alkyl, alkenyl, aryl, alkaryl and aralky radicals containing from 1 to 10 carbon atoms, X is selected from the group consisting of hydrogen and halogen atoms, and q is an integer between 1 and 3.

11. Process according to claim 10 wherein the aluminium alkyl compound is triisobutyl aluminium.

12. Process according to claim 9 wherein the porous organic support is in the form of particles having microdspheroidal morphology with a diameter comprised between 5 and 1000 µm.

13. Process according to claim 9 wherein the functional group of the porous organic support is selected from the group consisting of hydroxy, primary amino, secondary amino, sulphonic, carboxylic, amido, N-monosubstituted amido, sulphonamido, N-monosubstituted sulphonamido, sulphydryl, imido and hydrazido groups.

14. Process according to claim 9 wherein the porous organic support is a partially cross-linked styrenic polymer.

15. Process according to claim 9 wherein the transition metal compound is selected from cyclopentadienyl compounds of formula (I):

wherein M is selected from the group consisting of Ti, Zr, Hf and V; $C_5R^1_{5-m}$ and $C_5R^1_{5-m}$ are cyclopentadienyl rings equally or differently substituted; substituents $R^1$, same or different from each other, are selected from the group consisting of hydrogen, alkyl, alkenyl, aryl, alkaryl and aralkyl radicals containing from 1 to 20 carbon atoms which can also contain Si or Ge atoms or $Si(CH_3)_3$ groups, or also two or four substituents $R^1$ of a same cyclopentadienyl group can form one to two rings having form 4 to 6 carbon atoms; $R^2$ is a group which bridge links the two cyclopentadienyl rings and is selected from the group consisting of $CR^3_2$, $C_2R^3_4$, $SiR^3_2$, $Si_2R^3_4$, $GeR^3_2$, $R^3_2SiCR^3_2$, $NR^1$ and $PR^1$, with substituents $R^3$, same or different from each other, which are $R^1$ or two or four substituents $R^3$ can give one or two rings having from 3 to 6 carbon atoms; substituents Q, same or different from each other, are selected from the group consisting of halogen, hydrogen, OH, SH, $R^1$, $OR^1$, $SR^1$, $NR^1_2$ and $PR^1_2$; and m is 0 or 1; n is 0 or 1; being 1 when m=1; p is 2 or 3.

16. Process according to claim 9 wherein the organo metallic compound of aluminium in an alumoxane.

17. Process for the preparation of a supported catalyst for the polymerization of olefins comprising:
(A) a porous organic support functionalized with between 1 and 6 meq/g of groups having active hydrogen atoms;
(B) at least one organo-metallic compound of aluminium containing at least one heteroatom selected from the group consisting of oxygen, nitrogen and sulfur; and
(C) at least one compound of a transition metal selected from those groups of IVb, Vb or VIb of the Periodic Table of the Elements, containing at least one cyclopentadienyl ligand;

comprising the steps of:

contacting in an inert solvent said organic support (A) and said organo-metallic compound of aluminium (B);

contacting in an inert solvent said organo-metallic compound of aluminium (B) and said compound of a transition metal (C);

thereafter contacting the product obtained by contacting (A) and (B) with the product obtained by contacting (B) and (C); and recovering the supported catalyst by removing the solvent.

18. Process according to claim 17 wherein the porous organic support is pre-contacted with at least an aluminium alkyl compound of formula (VI):

$$R^5_q AlX_{3-q} \qquad (VI)$$

wherein $R^5$ is selected from a group consisting of alkyl, alkenyl, aryl, alkaryl and aralkyl radicals containing from 1 to 10 carbon atoms, X is selected from the group consisting of hydrogen and halogen atoms, and q is an integer between 1 and 3.

19. Process according to claim 18 wherein the aluminium alkyl compound is triisobutyl aluminium.

20. Process according to claim 17 wherein the porous organic support is in the form of particles having microdspheroidal morphology with a diameter comprised between 5 and 1000 μm.

21. Process according to claim 17 wherein the functional group of the porous organic support is selected from the group consisting of hydroxy, primary amino, secondary amino, sulphonic, carboxylic, amido, N-monosubstituted amido, sulphonamido, N-monosubstituted sulphonamido, sulphydryl, imido and hydrazido groups.

22. Process according to claim 17 wherein the porous organic support is a partially cross-linked styrenic polymer.

23. Process according to claim 17 wherein the transition metal compound is selected from cyclopentadienyl compounds of formula (I):

$$(C_5R^1_{5-m})R^2_m(C_5R^1_{5-m})_n MQ_{p-n} \qquad (I)$$

wherein M is selected from the group consisting of Ti, Zr, Hf and V; $C_5R^1_{5-m}$ are cyclopentadienyl rings equally or differently substituted; substituents $R^1$, same or different from each other, are selected from the group consisting of hydrogen, alkyl, alkenyl, aryl, alkaryl and aralkyl radicals containing from 1 to 20 carbon atoms which can also contain Si or Ge atoms or $Si(CH_3)_3$ groups, or also two or four substituents $R^1$ of a same cyclopentadienyl group can form one or two rings having from 4 to 6 carbon atoms; $R^2$ is a group which bridge links the two cyclopentadienyl rings and is selected from the group consisting of $CR^3_2$, $C_2R^3_4$, $SiR^3_2$, $Si_2R^3_4$, $GeR^3_2$, $R^3_2SiCR^3_2$, $NR^1$ and $PR^1$, which substituents $R^3$, same or different from each other, which are $R^1$ or two or four substituents $R^3$ can give one or two rings having from 3 to 6 carbon atoms; substituents Q, same or different from each other, are selected from the group consisting of halogen, hydrogen, OH, SH, $R^1$, $OR^1$, $SR^1$, $NR^1$, and $PR^1_2$; and m is 0 or 1; n is 0 or 1; being 1 when m=1; p is 2 or 3.

24. Process according to claim 18 wherein the organic metallic compound of aluminium is an alumoxane.

* * * * *

UNITED STATES PATENT AND TRADEMARK OFFICE
CERTIFICATE OF CORRECTION

PATENT NO.    : 6,444,604 B1
DATED         : September 3, 2002
INVENTOR(S)   : Enrico Albizzati et al.

It is certified that error appears in the above-identified patent and that said Letters Patent is hereby corrected as shown below:

<u>Title page,</u>
Item [56], References Cited, OTHER PUBLICATIONS, in the second "Dyachkovskii" publication, after "Polymerization", change "in" to -- on --.

<u>Column 29,</u>
Line 30, change "$(C_5R^1_{5-m,})R^2_mR(C_5R^1_{5-m})_nMQ_{p-n}$" to -- $(C_5R^1_{5-m})R^2_m(C_5R^1_{5-m})_nMQ_{p-n}$ --.

<u>Column 30,</u>
Line 11, change "$R^1$" to -- $R^5$ --.
Line 34, change "$(C_5R^1_{5-n})R^2_m(C_5R^1_{5-m})_nMQ_{p-n}$" to -- $(C_5R^1_{5-m})R^2_m(C_5R^1_{5-m})_nMQ_{p-n}$ --.
Line 44, change the second occurrence of "form" to -- from --.

<u>Column 32,</u>
Line 27, change "$NR^1$," to -- $NR^1_2$ --.

Signed and Sealed this

Third Day of June, 2003

JAMES E. ROGAN
*Director of the United States Patent and Trademark Office*